US012808328B2

(12) United States Patent
Ganiger et al.

(10) Patent No.: US 12,808,328 B2
(45) Date of Patent: Nov. 24, 2026

(54) TURBOMACHINE WITH AXIAL THRUST MANAGEMENT

(71) Applicant: General Electric Company, Schenectady, NY (US)

(72) Inventors: Ravindra Shankar Ganiger, Bengaluru (IN); David Raju Yamarthi, Bengaluru (IN); Rajesh Kumar, Bengaluru (IN); Hiranya Kumar Nath, Bengaluru (IN)

(73) Assignee: General Electric Company, Evendale, OH (US)

( * ) Notice: Subject to any disclaimer, the term of this patent is extended or adjusted under 35 U.S.C. 154(b) by 54 days.

(21) Appl. No.: 18/522,366

(22) Filed: Nov. 29, 2023

(65) Prior Publication Data

US 2025/0172095 A1 May 29, 2025

(51) Int. Cl.
*F02C 7/28* (2006.01)
*B64D 27/10* (2006.01)
*F02C 6/08* (2006.01)

(52) U.S. Cl.
CPC ................ *F02C 7/28* (2013.01); *B64D 27/10* (2013.01); *F02C 6/08* (2013.01); *F05D 2240/55* (2013.01)

(58) Field of Classification Search
CPC ... B64D 27/10; F01D 3/00; F01D 3/02; F01D 3/025; F01D 3/04; F02C 6/08; F02C 7/28; F04D 29/041; F04D 29/0413; F04D 29/0416; F04D 29/051; F04D 29/0513; F04D 29/0516
USPC ........................................................ 415/170.1
See application file for complete search history.

(56) References Cited

U.S. PATENT DOCUMENTS

| | | | | |
|---|---|---|---|---|
| 4,451,110 | A | 5/1984 | Forestier et al. | |
| 4,653,267 | A * | 3/1987 | Brodell | F01D 25/125 60/39.83 |
| 5,052,828 | A | 10/1991 | Ciokajlo et al. | |
| 5,634,766 | A | 6/1997 | Cunha et al. | |
| 5,658,125 | A | 8/1997 | Burns et al. | |
| 6,514,046 | B1 | 2/2003 | Morrison et al. | |
| 7,156,613 | B2 * | 1/2007 | Friedl | F01D 3/04 415/231 |
| 8,092,150 | B2 | 1/2012 | Rofka et al. | |
| 8,182,201 | B2 | 5/2012 | Alecu et al. | |
| 8,662,756 | B2 | 3/2014 | Care et al. | |
| 8,727,632 | B2 | 5/2014 | Do et al. | |
| 8,734,211 | B2 | 5/2014 | Tuchimaa et al. | |

(Continued)

*Primary Examiner* — Nathaniel E Wiehe
*Assistant Examiner* — Justin A Pruitt
(74) *Attorney, Agent, or Firm* — McCarter & English, LLP

(57) ABSTRACT

A turbomachine comprises a high-pressure rotor shaft defining an outer surface and including a rotor seal disposed along the outer surface. A compressor discharge plenum extends annularly around the outer surface of the high-pressure rotor shaft and is at least partially formed from an inner casing assembly defining a first airflow opening. The rotor seal is configured to form a first seal against a first surface of the inner casing assembly. A pressure seal disk is coupled to the high-pressure rotor shaft. The pressure seal disk is configured to form a second seal against a second surface of the inner casing assembly. The inner casing assembly, the high-pressure rotor shaft, the rotor seal, and the pressure seal disk form a pressure chamber therebetween. The pressure chamber is in fluid communication with the compressor discharge plenum via the first airflow opening.

18 Claims, 8 Drawing Sheets

(56) References Cited

U.S. PATENT DOCUMENTS

| | | | | |
|---|---|---|---|---|
| 8,967,528 | B2 * | 3/2015 | Mackin | F02C 6/08 244/134 R |
| 9,121,305 | B2 | 9/2015 | Nicholson | |
| 9,121,448 | B2 | 9/2015 | Delgado Marquez et al. | |
| 9,279,449 | B2 | 3/2016 | Rouesne | |
| 9,297,310 | B2 | 3/2016 | Giri et al. | |
| 9,447,817 | B2 | 9/2016 | Gallimore et al. | |
| 9,476,320 | B2 | 10/2016 | Savela | |
| 9,546,570 | B2 | 1/2017 | Fletcher et al. | |
| 9,638,062 | B2 | 5/2017 | Davis | |
| 9,644,541 | B2 | 5/2017 | Morreale et al. | |
| 9,739,206 | B2 | 8/2017 | Houston et al. | |
| 9,856,751 | B2 | 1/2018 | Duong et al. | |
| 10,119,476 | B2 * | 11/2018 | Caprario | F01D 5/081 |
| 10,337,405 | B2 * | 7/2019 | Steen | F01D 9/065 |
| 10,612,383 | B2 * | 4/2020 | Moniz | F01D 5/084 |
| 10,823,002 | B2 | 11/2020 | Ganiger et al. | |
| 10,830,092 | B2 * | 11/2020 | Snow | G01L 5/0019 |
| 11,060,530 | B2 * | 7/2021 | Petrasko | F01D 5/084 |
| 11,473,439 | B1 | 10/2022 | Giacobone et al. | |
| 11,852,073 | B2 * | 12/2023 | Dobson | F04D 25/04 |
| 2006/0045404 | A1 | 3/2006 | Allmon et al. | |
| 2009/0067984 | A1 | 3/2009 | Rofka et al. | |
| 2009/0074560 | A1 | 3/2009 | Madison | |
| 2010/0209232 | A1 | 8/2010 | Stein et al. | |
| 2012/0213629 | A1 | 8/2012 | Rouesne | |
| 2013/0108202 | A1 | 5/2013 | Do et al. | |
| 2013/0280063 | A1 | 10/2013 | Ganiger et al. | |
| 2014/0060083 | A1 | 3/2014 | Savela | |
| 2016/0186596 | A1 | 6/2016 | Tatman et al. | |
| 2016/0341070 | A1 | 11/2016 | Garcia et al. | |
| 2017/0030223 | A1 | 2/2017 | Parry et al. | |
| 2017/0051629 | A1 | 2/2017 | Sutherland | |
| 2017/0089353 | A1 | 3/2017 | Zhang et al. | |
| 2017/0122215 | A1 | 5/2017 | Houston et al. | |
| 2017/0145855 | A1 | 5/2017 | Ganiger et al. | |
| 2017/0234158 | A1 | 8/2017 | Savela | |
| 2017/0248191 | A1 | 8/2017 | Husband et al. | |
| 2018/0320552 | A1 | 11/2018 | Harris et al. | |
| 2018/0371948 | A1 | 12/2018 | Lepretre et al. | |
| 2021/0123358 | A1 | 4/2021 | Johnson et al. | |
| 2022/0090512 | A1 | 3/2022 | Maddaleno et al. | |

* cited by examiner

TURBOMACHINE WITH AXIAL THRUST MANAGEMENT

FIELD

The present disclosure relates to a turbomachine. More particularly, this disclosure is directed to a turbomachine with axial thrust management.

BACKGROUND

A turbomachine, such as a gas turbomachine, generally includes a compressor section, a turbine section, and a rotor shaft or rotor shaft assembly mechanically coupling the compressor and the turbine. The rotor shaft is generally supported by various bearings designed to allow for rotation of the rotor shaft while accommodating for radial and axial loads exerted by the rotor shaft during various operating modes of the turbomachine. Axial loads include axial thrust. Axial thrust is generally absorbed by a rotor or thrust bearing. Axial thrust increases and decreases as the turbomachine cycles through various operating conditions thereby resulting in wear on the thrust bearings.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
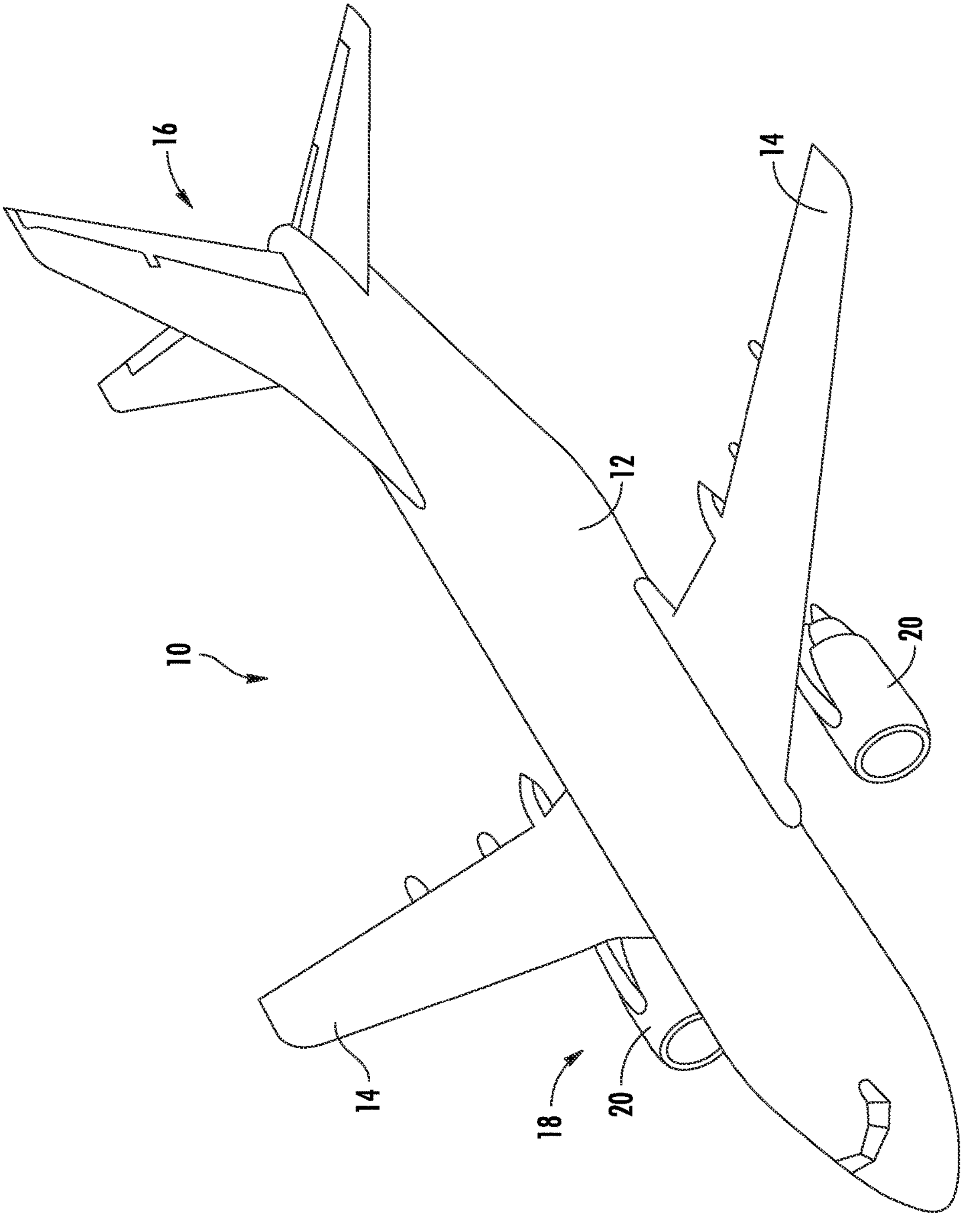
FIG. 1 is a perspective view of an exemplary aircraft in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary. The singular forms "a", "an", and "the" include plural references unless the context clearly dictates otherwise. The term "at least one of" in the context of, e.g., "at least one of A, B, and C" refers to only A, only B, only C, or any combination of A, B, and C.

As used herein, the terms "first", "second", and "third" may be used interchangeably to distinguish one component from another and are not intended to signify location or importance of the individual components. Furthermore, the terms "upstream" and "downstream" refer to the relative direction with respect to fluid flow in a fluid pathway. For example, "upstream" refers to the direction from which the fluid flows, and "downstream" refers to the direction to which the fluid flows. The terms "forward" and "aft" refers to the location or position of one component or feature in relation to another component or feature of a turbomachine or aircraft. The forward most position is generally related to an inlet of a turbomachine.

The term "turbomachine" refers to a machine including one or more compressors, a heat generating section (e.g., a combustion section), and one or more turbines that together generate a torque output. The term "gas turbomachine" refers to an engine having a turbomachine as all or a portion of its power source. Example gas turbomachines include turbofan engines, turboprop engines, turbojet engines, turboshaft engines, etc., as well as hybrid-electric versions of one or more of these engines.

The present disclosure is generally related to managing axial thrust loads generated during various operational modes of a turbomachine. Axial thrust loads include axial thrust which is the resulting force from aerodynamic forces and pressure forces which exert an axial force on a rotor shaft in the compressor and turbine and also may include all pressure and vibrational forces which act upon the rotor shaft in the axial direction. The disclosure provides for creating a cavity or pressure chamber radially inward from a compressor discharge plenum of the turbomachine to reduce or manage any negative effect of axial thrust loads.

The pressure chamber is formed between a rotor seal, a pressure seal disk coupled to a high-pressure rotor shaft, and a wall of an inner casing assembly which at least partially defines the compressor discharge plenum. A portion of compressed air from the compressor discharge plenum is routed into the pressure chamber. The pressure inside the pressure chamber exerts an axial force against a face or side wall of the pressure seal disk. The axial force applied to the face or side wall opposes or counters axial thrust forces acting on the rotor shaft. This helps to mitigate axial thrust loads on axial bearings which partially support the high-pressure rotor shaft, thus reducing wear on the axial bearings and increasing the time between required maintenance.

Referring now to the drawings, FIG. 1 is a perspective view of an exemplary aircraft 10 that may incorporate at least one exemplary embodiment of the present disclosure. As shown in FIG. 1, the aircraft 10 has a fuselage 12, wings 14 attached to the fuselage 12, and an empennage 16. The aircraft 10 further includes a propulsion system 18 that produces a propulsive thrust to propel the aircraft 10 in flight, during taxiing operations, etc. Although the propulsion system 18 is shown attached to the wing(s) 14, in other embodiments it may additionally or alternatively include one or more aspects coupled to other parts of the aircraft 10, such as, for example, the empennage 16, the fuselage 12, or both. The propulsion system 18 includes at least one turbomachine. In the exemplary embodiment shown, aircraft 10 includes a pair of gas turbine engines 20. Each gas turbine engine 20 is mounted to the aircraft 10 in an under-wing configuration. Each gas turbine engine 20 is capable of selectively generating propulsive thrust for the aircraft 10. The gas turbine engine 20 may be configured to burn various forms of fuel including, but not limited to unless otherwise provided, jet fuel/aviation turbine fuel, and hydrogen fuel.

Figure 2:
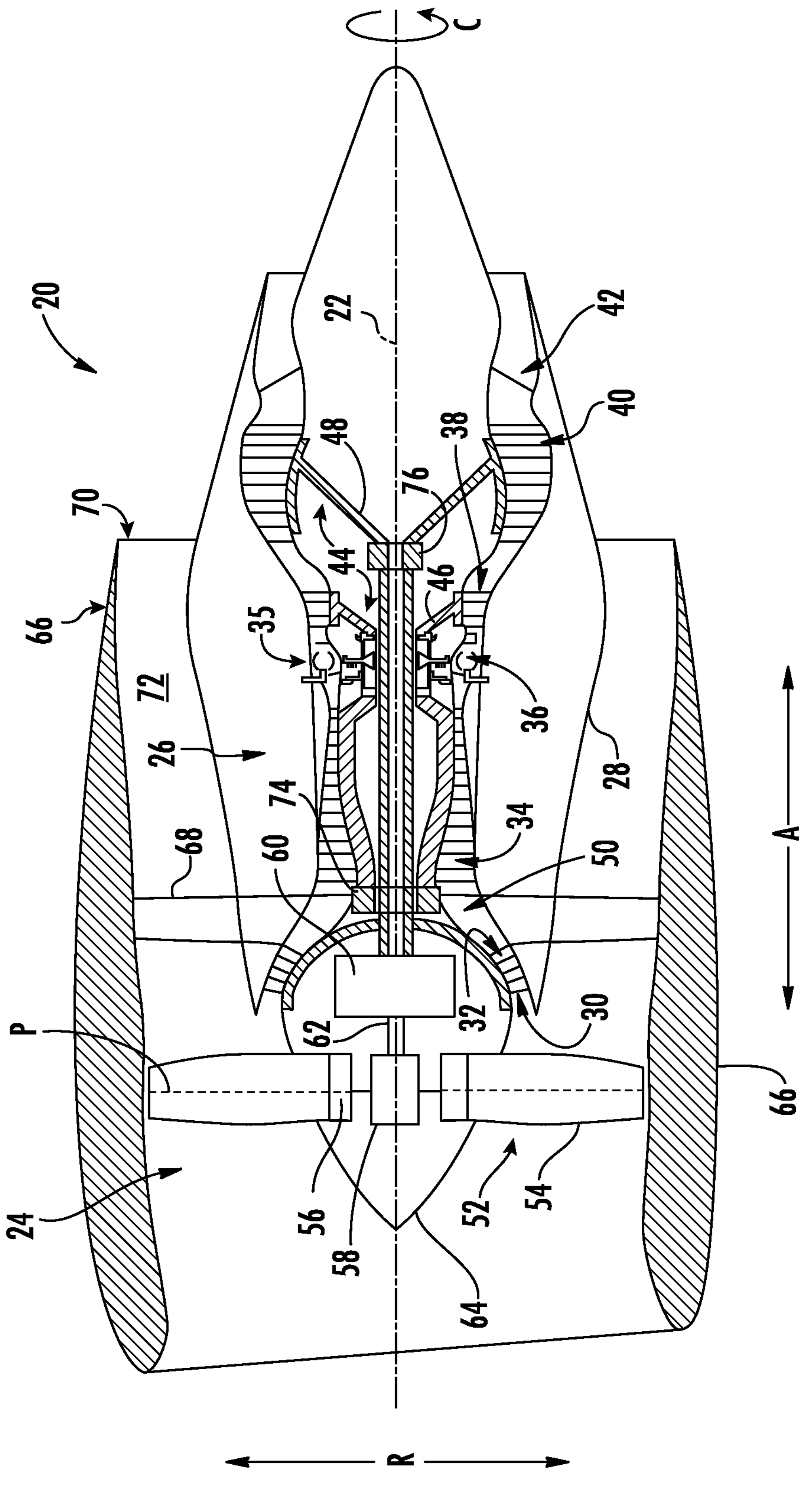
FIG. 2 is a cross-sectional view of an exemplary gas turbomachine in accordance with an exemplary aspect of the present disclosure.

FIG. 2 is a cross-sectional side view of a gas turbine engine 20 in accordance with an exemplary embodiment of the present disclosure. More particularly, for the embodiment of FIG. 2, the gas turbine engine 20 is a multi-spool, high-bypass turbofan jet engine, sometimes also referred to as a "turbofan engine." As shown in FIG. 2, the gas turbine engine 20 defines an axial direction "A" (extending parallel to a longitudinal centerline 22 provided for reference), a radial direction "R", and a circumferential direction "C" extending about the longitudinal centerline 22. In general, the gas turbine engine 20 includes a fan section 24 and a turbine engine or turbomachine 26 disposed downstream from the fan section 24.

The turbomachine 26 depicted generally includes an engine housing, casing, or core cowl 28 that defines an annular core inlet 30. The core cowl 28 at least partially encases, in serial flow relationship, a compressor section including a booster or low-pressure compressor 32 and a high-pressure compressor 34, a combustion section 35 including a combustor 36, a turbine section including a high-pressure turbine 38 and a low-pressure turbine 40, and at least a portion of a jet exhaust nozzle 42. Together, these components or sections make up a core-engine of turbomachine 26.

The turbomachine 26 includes a rotor shaft assembly 44 including at least one rotor shaft. In the exemplary embodiment shown in FIG. 2, the rotor shaft assembly 44 includes a high-pressure rotor shaft 46 drivingly connecting the high-pressure turbine 38 to the high-pressure compressor 34. A low-pressure rotor shaft 48 drivingly connects the low-pressure turbine 40 to the low-pressure compressor 32. The compressor section, combustion section 35, turbine section, and jet exhaust nozzle 42 together define a working gas flow path 50 through the gas turbine engine 20.

For the embodiment depicted, the fan section 24 includes a fan 52 having a plurality of fan blades 54 coupled to a disk 56 in a circumferentially spaced apart manner. As depicted, the fan blades 54 extend outwardly from disk 56 generally along the radial direction R. Each fan blade 54 is rotatable with the disk 56 about a pitch axis P by virtue of the fan blades 54 being operatively coupled to a pitch change mechanism 58 configured to collectively vary the pitch of the fan blades 54, e.g., in unison. The fan blades 54, disk 56, and pitch change mechanism 58 are together rotatable about the longitudinal centerline 22 by the low-pressure rotor shaft 48.

In an exemplary embodiment, as shown in FIG. 2, the gas turbine engine 20 further includes a power gearbox or gearbox 60. The gearbox 60 includes a plurality of gears for adjusting a rotational speed of the fan 52 relative to a rotational speed of the low-pressure rotor shaft 48, such that the fan 52 and the low-pressure rotor shaft 48 may rotate at more efficient relative speeds. The gearbox 60 may be any type of gearbox suitable to facilitate coupling the low-pressure rotor shaft 48 to the fan 52 while allowing each of the low-pressure turbine 40 and the fan 52 to operate at a desired relative speed. For example, in some embodiments, the gearbox 60 may be a reduction gearbox.

Referring still to the exemplary embodiment of FIG. 2, disk 56 is connected to the gearbox 60 via a fan shaft 62. The disk 56 is covered by a front hub 64 of the fan section 24 (sometimes also referred to as a "spinner"). The front hub 64 is aerodynamically contoured to promote airflow through or across the plurality of fan blades 54. Additionally, the fan section 24 includes an annular fan casing or nacelle 66 that circumferentially surrounds the fan 52 and at least a portion of the turbomachine 26. The nacelle 66 is supported relative to the turbomachine 26 by a plurality of circumferentially spaced struts or outlet guide vanes 68 in the embodiment depicted. Moreover, a downstream section 70 of the nacelle 66 extends over an outer portion of the turbomachine 26 to define a bypass airflow passage 72 therebetween.

In exemplary embodiments, the rotor shaft assembly 44 is at least partially supported by one or more bearings 74, 76. At least one of the one or more bearings 74, 76 is an axial thrust or thrust bearing configured to accommodate for aerodynamic forces and pressure forces which exert axial forces on the high-pressure rotor shaft 46 and the low-pressure rotor shaft 48 as the turbomachine 26 cycles through various operating conditions. For example, the axial forces may increase or decrease during particular operations conditions.

Figure 3:
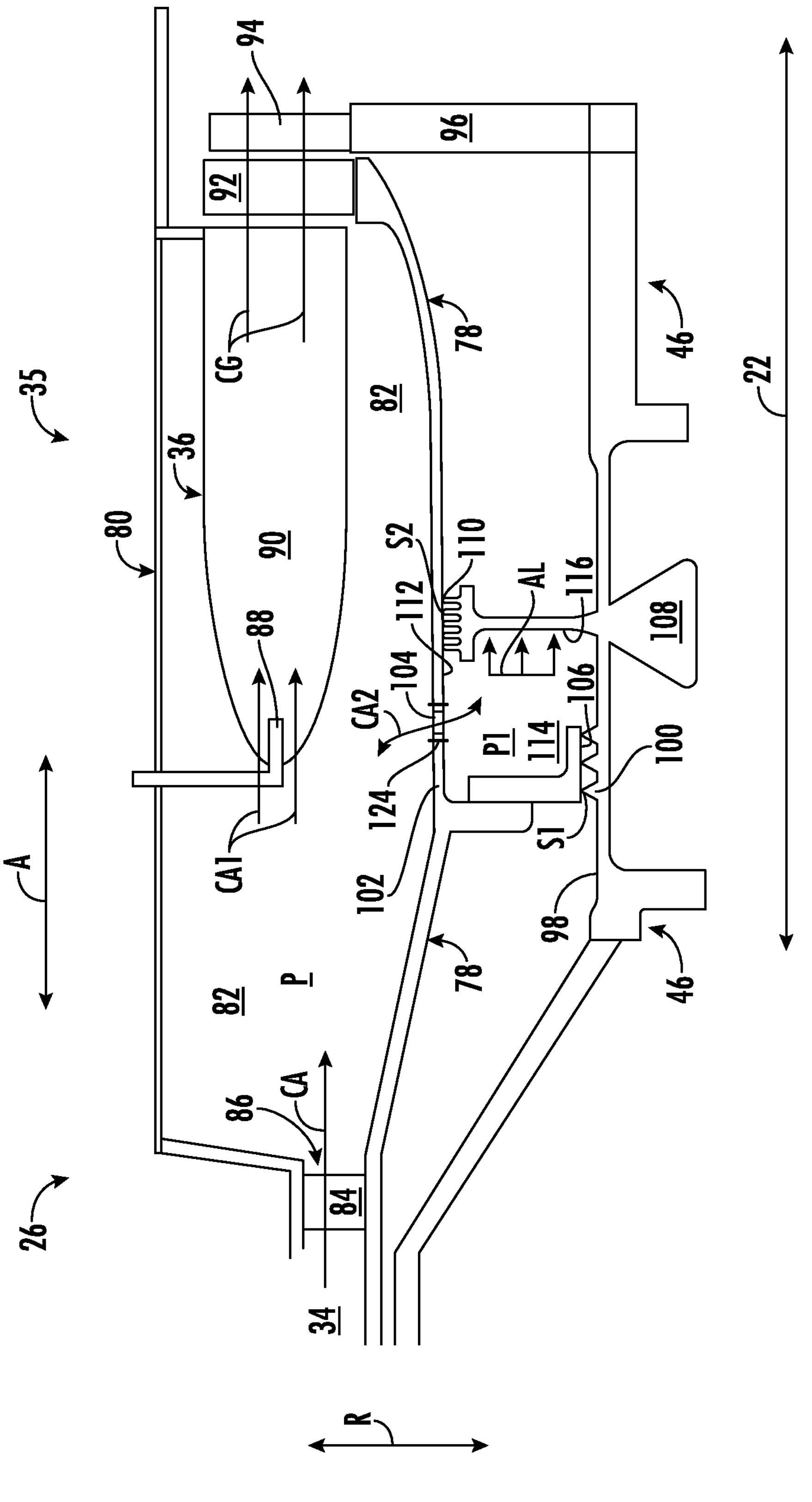
FIG. 3 is a schematic side view of a combustion section of the turbomachine as shown in FIG. 2, according to an exemplary embodiment of the present disclosure.

FIG. 3 is a schematic side view of the combustion section 35 of the turbomachine 26 as shown in FIG. 2, according to an exemplary embodiment of the present disclosure. As shown in FIG. 3, the combustion section 35 includes an inner casing assembly 78 and an outer casing assembly 80. The inner casing assembly 78 and the outer casing assembly 80 form a compressor discharge plenum 82 therebetween. The combustor 36 is generally disposed within the compressor discharge plenum 82.

In operation, compressed air "CA" from the high-pressure compressor 34 (FIG. 2) flows across a flow conditioner 84 disposed at an inlet 86 of the compressor discharge plenum 82 and into the compressor discharge plenum 82. A first portion "CA1" of the compressed air CA is routed around a fuel nozzle 88 and into a combustion chamber 90 of the combustor 36 disposed within the compressor discharge plenum 82 where fuel is mixed with the first portion CA1 of the compressed air CA and burned to generate combustion gases "CG". The combustion gases CG are then directed across a row or stage of stationary or stator vanes 92 (only one shown) and then across a row of turbine rotor blades 94 (only one shown) thus causing the high-pressure rotor shaft 46 to rotate about longitudinal centerline 22. The turbine rotor blades 94 are fixed to the high-pressure rotor shaft 46 via a turbine rotor disk 96 (or other suitable manner) which is coupled to and at least partially defines the high-pressure rotor shaft 46.

In exemplary embodiments, the high-pressure rotor shaft 46 includes or defines a radially outer surface or outer surface 98. A rotor seal 100 extends circumferentially along the outer surface 98. The compressor discharge plenum 82, more particularly, the inner casing assembly 78 and the outer casing assembly 80, extends annularly around the outer surface 98 of the high-pressure rotor shaft 46 with respect to longitudinal centerline 22. A wall 102 of the inner casing assembly 78 defines a first airflow opening 104. The rotor seal 100 is configured or shaped to form a first seal "S1" against a first surface 106 of the inner casing assembly 78. A pressure seal disk 108 is coupled to and rotates with the high-pressure rotor shaft 46. The pressure seal disk 108 is disposed aft of the flow conditioner 84, aft of the rotor seal 100, forward of the turbine rotor disk 96, and radially inward from the wall 102 of the inner casing assembly 78 with respect to axial direction A, radial direction R, and the longitudinal centerline 22.

A sealing or radially distal end or sealing face 110 of the pressure seal disk 108 is configured or shaped to form a second seal "S2" against a second surface 112 of the inner casing assembly 78. The inner casing assembly 78, the high-pressure rotor shaft 46, the rotor seal 100, and the pressure seal disk 108 together form a pressure chamber 114 therebetween. The pressure chamber 114 is in fluid communication with the compressor discharge plenum 82 via the first airflow opening 104.

In operation, a second portion "CA2" of the compressed air CA from the compressor discharge plenum 82 flows into the pressure chamber 114 via the first airflow opening 104 to pressurize or charge the pressure chamber 114 at a first pressure "P1", thereby placing an axial load, as indicated by arrows "AL", against a forward sidewall or forward side face 116 of the pressure seal disk 108 with respect to axial direction A. In exemplary embodiments, the axial load AL acts to reduce or manage forward axial movement of the high-pressure rotor shaft 46 as the turbomachine operates in or transitions between various operating conditions. When pressure "P" in the compressor discharge plenum 82 drops below the first pressure P1 in the pressure chamber 114, the second portion CA2 of the compressed air CA flows out of the pressure chamber 114 and back into the compressor discharge plenum 82 via the first airflow opening 104.

Figure 4:
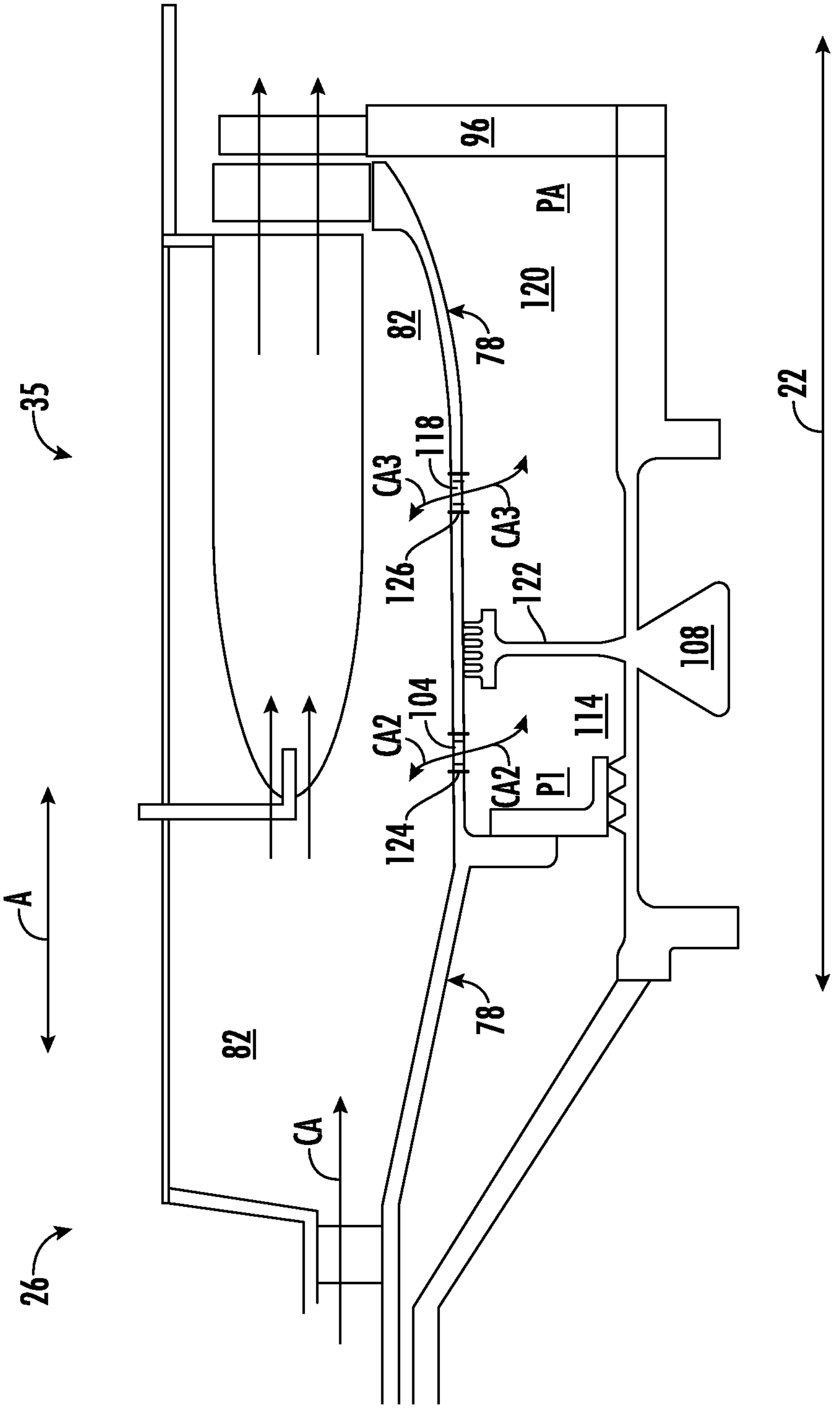
FIG. 4 is a schematic side view of a combustion section of the turbomachine as shown in FIG. 2, according to an exemplary embodiment of the present disclosure.

FIG. 4 is a schematic side view of the combustion section 35 of the turbomachine 26 as shown in FIG. 2, according to an exemplary embodiment of the present disclosure. It is to be appreciated that the combustion section shown in FIG. 4 is similar to the combustion section 35 shown in FIG. 3 with like components, numbering, and functionality. As shown in FIG. 4, the inner casing assembly 78 may define a second airflow opening 118 disposed aft of the pressure seal disk 108 within the compressor discharge plenum 82 with respect to axial direction A and longitudinal centerline 22. The second airflow opening 118 is in fluid communication with the compressor discharge plenum 82 to allow a third portion CA3 of the compressed air CA to flow into an aft pressure chamber 120 defined aft of the pressure seal disk 108. The aft pressure chamber 120 is generally defined between a second face or aft side face 122 of the pressure seal disk 108 and the turbine rotor disk 96. Pressure "PA" inside the aft pressure chamber 120 may be lower than, or greater than the first pressure P1 of the second portion CA2 of the compressed air CA inside the pressure chamber 114 during some or all operating conditions of the turbomachine 26.

In particular embodiments, as shown in FIGS. 3 and 4 collectively, at least one of the first airflow opening 104 and the second airflow opening 118 includes an insert 124 or insert 126 respectively disposed therein. Insert 124 may be configured to control or meter the flow of the second portion CA2 of the compressed air CA from the compressor discharge plenum 82 into and out of the pressure chamber 114. For example, the insert 124 may have a predefined diameter for a fixed flow rate or may be made of a shape-memory alloy for a variable flow rate dependent on temperature of the compressed air CA which may fluctuate depending on an operating mode of the turbomachine 26. Similarly, insert 126 may be configured to control or meter the flow of the third portion CA3 of the compressed air CA from the compressor discharge plenum 82 into and out of the aft pressure chamber 120 (FIG. 4). For example, the insert 126 may have a predefined diameter for a fixed flow rate or may be made of a shape-memory alloy for a variable flow rate dependent on temperature of the compressed air CA which may fluctuate depending on an operating mode of the turbomachine 26.

Figure 5:
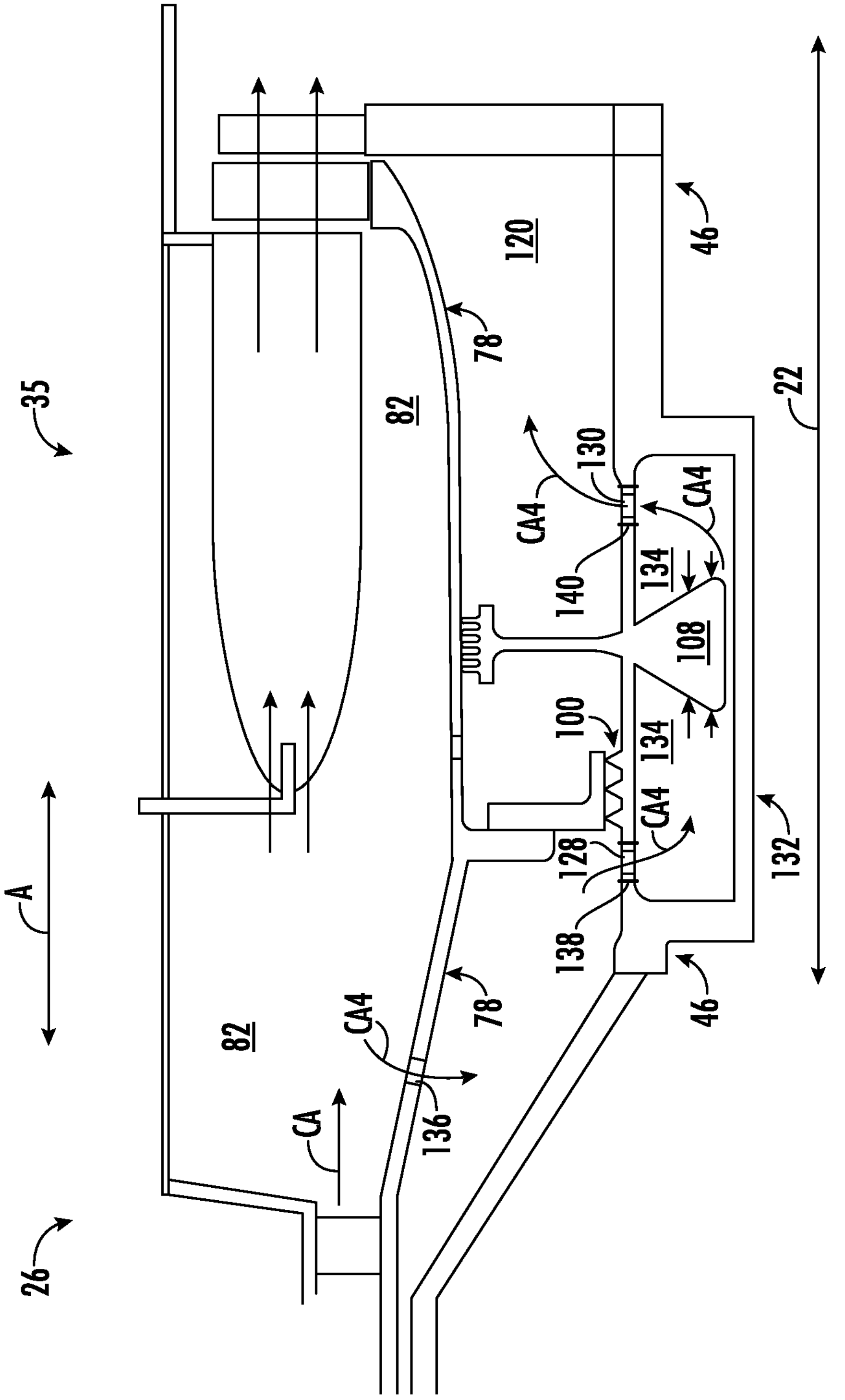
FIG. 5 is a schematic side view of a combustion section of the turbomachine as shown in FIG. 2, according to an exemplary embodiment of the present disclosure.

FIG. 5 is a schematic side view of the combustion section 35 of the turbomachine 26 as shown in FIG. 2, according to an exemplary embodiment of the present disclosure. It is to be appreciated that the combustion section shown in FIG. 5 is similar to the combustion section 35 shown in FIGS. 3 and 4 with like components, numbering, and functionality. As shown in FIG. 5, high-pressure rotor shaft 46 defines a first bypass opening 128 defined aft of the flow conditioner 84, and forward of the rotor seal 100 with respect to axial direction A and the longitudinal centerline 22. In exemplary embodiments, the high-pressure rotor shaft 46 further defines a second bypass opening 130 defined aft of the pressure seal disk 108 and forward of the turbine rotor disk 96 with respect to axial direction A and the longitudinal centerline 22.

An inner wall 132 (radially inward with respect to the radial direction R) of the high-pressure rotor shaft 46 at least partially forms a bypass air chamber 134 within the high-pressure rotor shaft 46. In these embodiments, another portion of the compressed air CA, indicated as "CA4", flows from the compressor discharge plenum 82, through an opening 136 defined in the inner casing assembly 78, through the first bypass opening 128 and into the bypass air chamber 134, past the pressure seal disk 108, out of the bypass air chamber 134 via the second bypass opening 130, and into the aft pressure chamber 120.

In particular embodiments, as shown in FIG. 5, at least one of the first bypass opening 128 and the second bypass opening 130 includes an insert 138, 140 respectively disposed therein. Insert 138 may be configured to control or meter the flow of the portion CA4 of the compressed air CA from the compressor discharge plenum 82 into the bypass air chamber 134. For example, the insert 138 may have a predefined diameter for a fixed flow rate or may be made of a shape-memory alloy for a variable flow rate dependent on temperature of the compressed air CA which may fluctuate depending on an operating mode of the turbomachine 26. Similarly, insert 140 may be configured to control or meter the flow of the portion CA4 of the compressed air CA from the bypass air chamber 134 and into the aft pressure chamber 120. For example, the insert 140 may have a predefined diameter for a fixed flow rate or may be made of a shape-memory alloy for a variable flow rate dependent on temperature of the compressed air CA which may fluctuate depending on an operating mode of the turbomachine 26. The portion CA4 of the compressed air CA may apply an axial load against the pressure seal disk 108 in either a forward direction, an aft direction, or both forward and aft directions with respect to axial direction A and longitudinal centerline 22, to reduce axial thrust loads on the axial thrust bearing(s).

Figure 6:
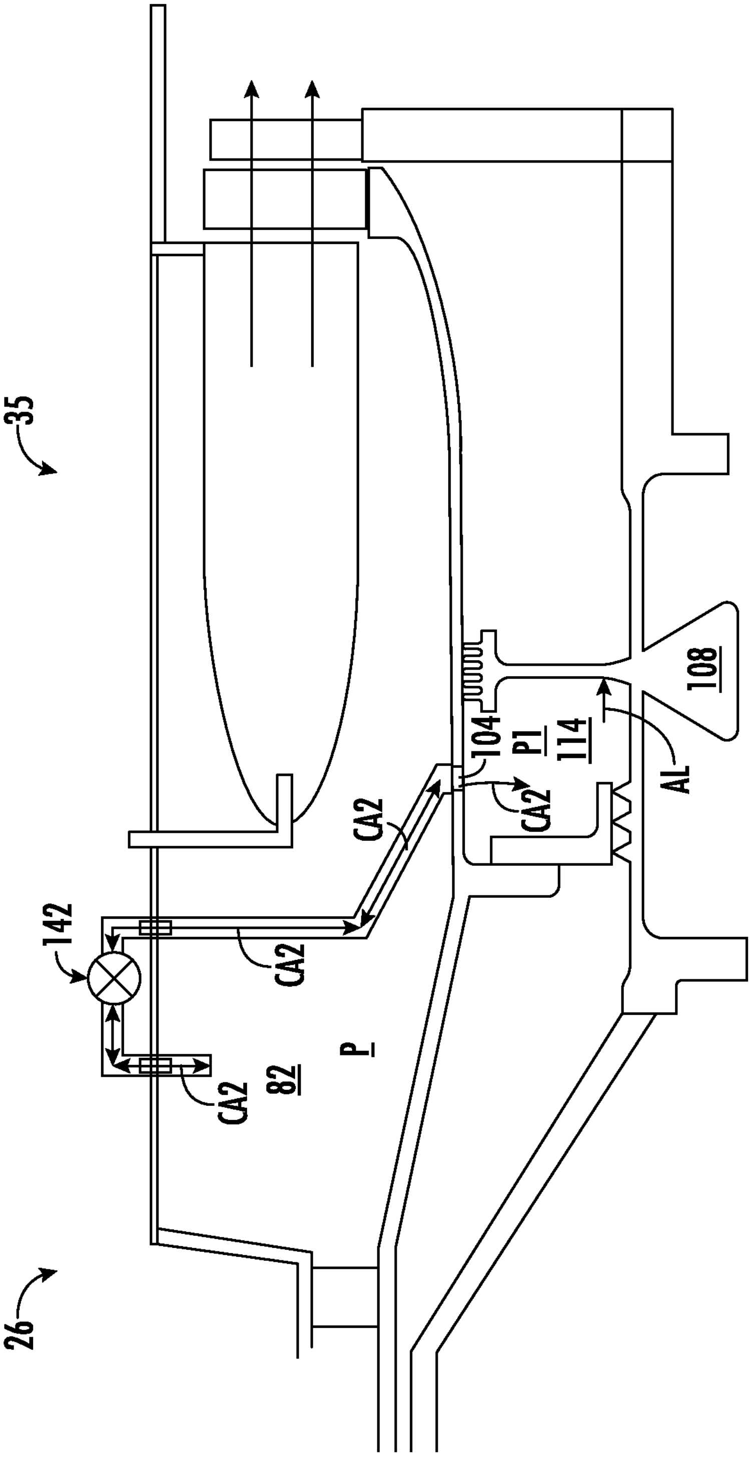
FIG. 6 is a schematic side view of a combustion section of the turbomachine as shown in FIG. 2, according to an exemplary embodiment of the present disclosure.

FIG. 6 is a schematic side view of the combustion section 35 of the turbomachine 26 as shown in FIG. 2, according to an exemplary embodiment of the present disclosure. It is to be appreciated that the combustion section shown in FIG. 6 is similar to the combustion section 35 shown in FIGS. 3, 4, and 5 with like components, numbering, and similar functionality. However, the exemplary embodiment of FIG. 6 includes a pump 142 fluidly coupled to the compressor discharge plenum 82 and to the first airflow opening 104 via various conduits, pipes, couplings or other suitable connections. The pump 142 is configured to control or modulate the first pressure P1 of the second portion CA2 of the compressed air CA within the pressure chamber 114 during operation of the turbomachine 26. The pump 142 may be configured to provide a constant first pressure P1 or to modulate first pressure P1 within pressure chamber 114 at a desired pressure to achieve a desired axial load AL on the pressure seal disk 108 regardless of the operational condition of the turbomachine or pressure P inside the compressor discharge plenum 82.

Figure 7:
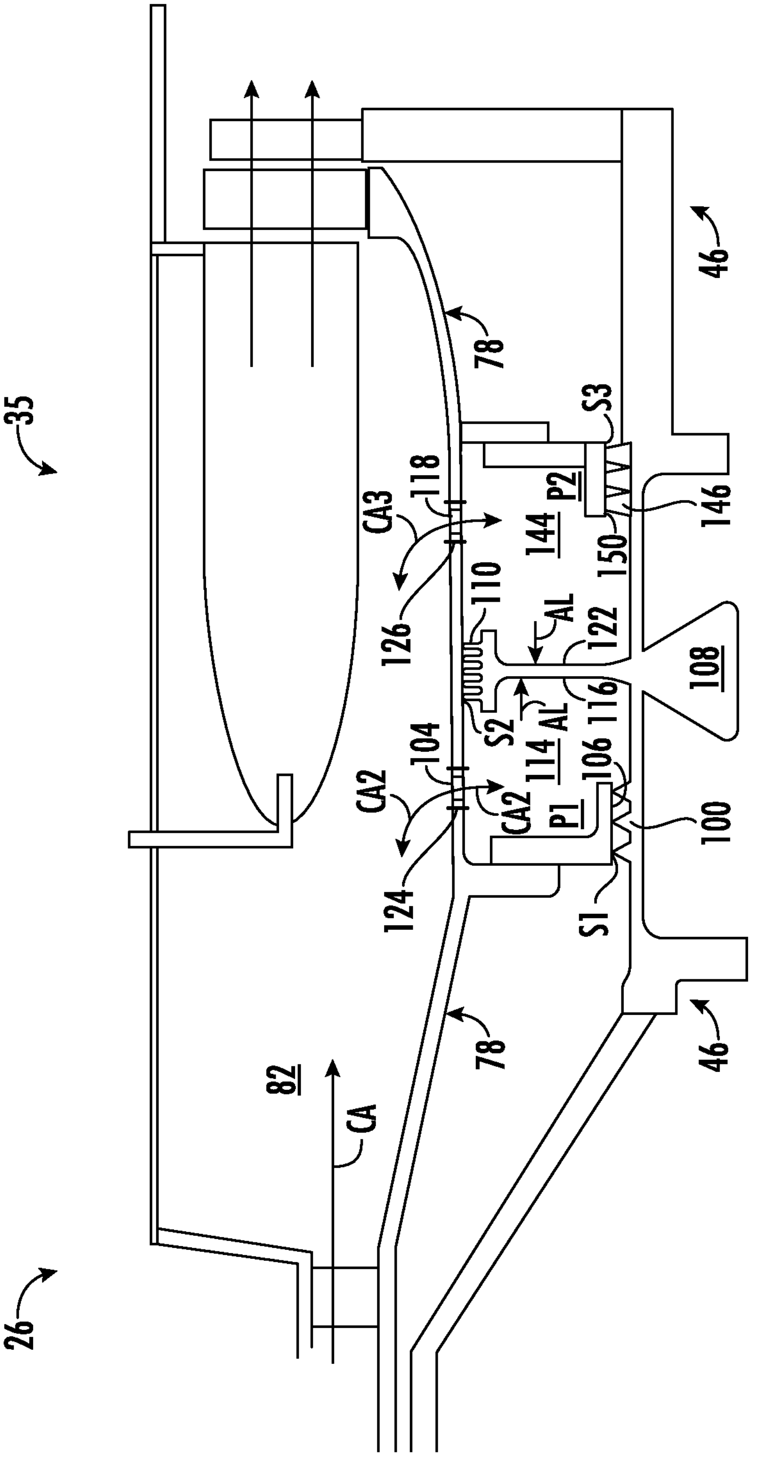
FIG. 7 is a schematic side view of a combustion section of the turbomachine as shown in FIG. 2, according to an exemplary embodiment of the present disclosure.

FIG. 7 is a schematic side view of a combustion section of the turbomachine 26 as shown in FIG. 2, according to an exemplary embodiment of the present disclosure. It is to be appreciated that the combustion section 35 shown in FIG. 7 is similar to the combustion section 35 shown in FIGS. 3 and 4 with like components, numbering, and functionality. As shown in FIG. 7, the inner casing assembly 78 defines the first airflow opening 104 and the second airflow opening 118. The pressure seal disk 108 is coupled to the high-pressure rotor shaft 46. The pressure seal disk 108 includes the forward side face 116 and the sealing face 110. The pressure seal disk 108 further includes or defines the aft side face 122.

Pressure chamber 114 is at least partially defined by the high-pressure rotor shaft 46, the inner casing assembly 78, and the forward side face 116 of the pressure seal disk 108. Pressure chamber 114 is in fluid communication with the compressor discharge plenum 82 via the first airflow opening 104. A second pressure chamber 144 is at least partially defined by the high-pressure rotor shaft 46, the inner casing assembly 78, and the aft side face 122 of the pressure seal disk 108. The second pressure chamber 144 is in fluid communication with the compressor discharge plenum 82 via the second airflow opening 118.

In the exemplary embodiment, the rotor seal 100 is configured to form the first seal S1 against the first surface 106 of the inner casing assembly 78. The sealing face 110 of the pressure seal disk 108 is configured to form the second seal S2 against the second surface 112 of the inner casing assembly 78. A second rotor seal 146 is configured to form a third seal "S3" against a third surface 150 of the inner casing assembly 78. First airflow opening 104 and second airflow opening 118 may be sized to control the first pressure P1 in the first pressure chamber 114 and the second pressure P2 in the second pressure chamber 144. The first pressure P1 and the second pressure P2 may be predefined so as to provide counter acting axial loads AL against the pressure seal disk 108 to reduce or prevent axial thrust loads on the axial thrust bearings.

In other embodiments, one or more of the first airflow opening 104 and the second airflow opening 118 may include insert 124 or insert 126 to control or meter the flow of the second portion CA2 of the compressed air CA from the compressor discharge plenum 82 into and out of the pressure chamber 114. For example, the insert 124 may have a predefined diameter for a fixed flow rate or may be made of a shape-memory alloy for a variable flow rate dependent on temperature of the compressed air CA which may fluctuate depending on an operating mode of the turbomachine 26. Similarly, insert 126 may be configured to control or meter the flow of the third portion CA3 of the compressed air CA from the compressor discharge plenum 82 into and out of the second pressure chamber 144. For example, the insert 126 may have a predefined diameter for a fixed flow rate or may be made of a shape-memory alloy for a variable flow rate dependent on temperature of the compressed air CA which may fluctuate depending on an operating mode of the turbomachine 26.

Figure 8:
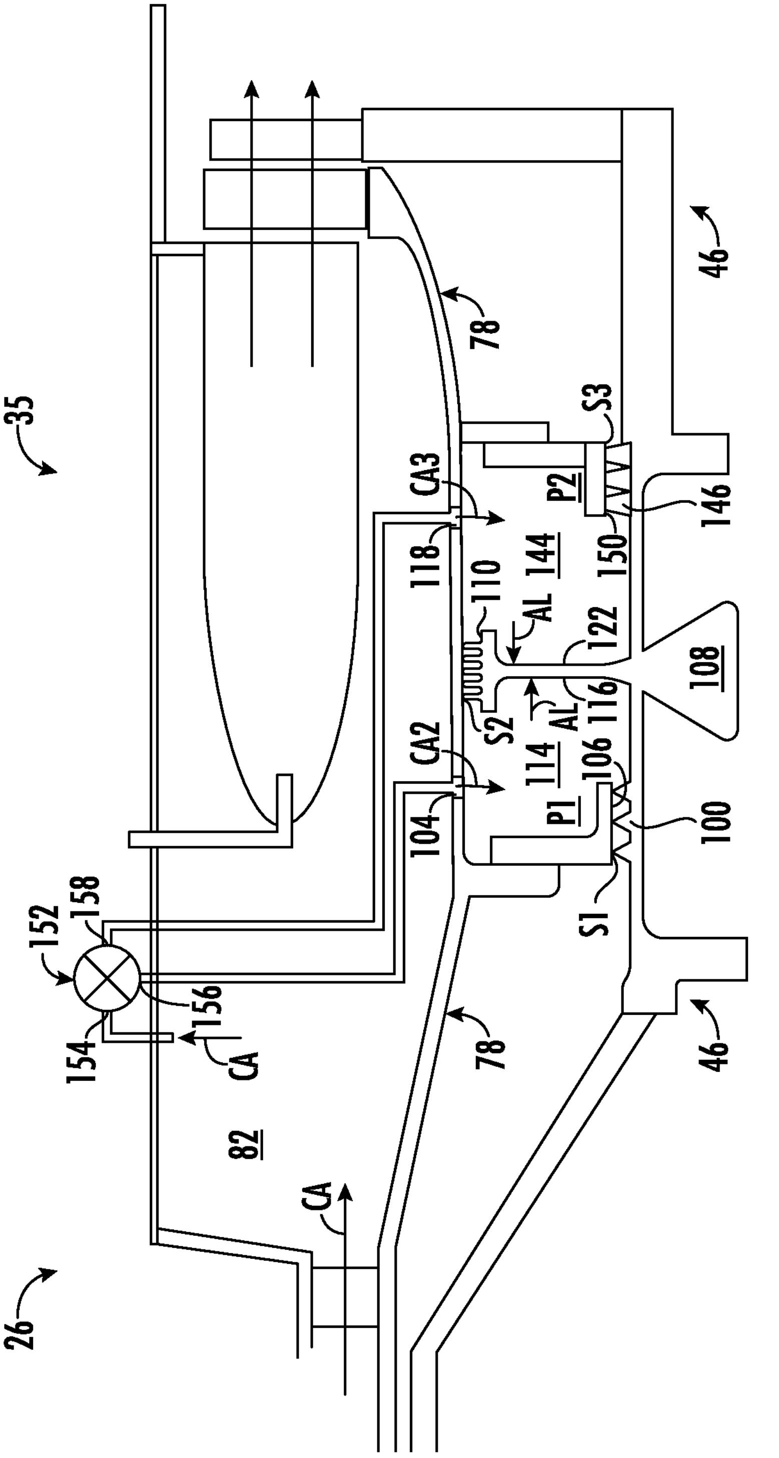
FIG. 8 is a schematic side view of a combustion section of the turbomachine as shown in FIG. 7, according to an exemplary embodiment of the present disclosure.

FIG. 8 is a schematic side view of a combustion section of the turbomachine 26 as shown in FIG. 7, according to an exemplary embodiment of the present disclosure. It is to be appreciated that the combustion section 35 shown in FIG. 8 is similar to the combustion section 35 shown in FIG. 7 with like components, numbering, and functionality. In exemplary embodiments, a flow control valve 152 is fluidly coupled to the compressor discharge plenum 82 via one or more fluid conduits or pipes coupled to an inlet 154 of the flow control valve 152. The flow control valve 152 further includes a first outlet 156 that is fluidly coupled to and in fluid communication with the first pressure chamber 114 via the first airflow opening 104, and a second outlet 158 in fluid communication with the second pressure chamber 144 via the second airflow opening 118. In the exemplary embodiment, the flow control valve 152 is configured to control the first pressure P1 of the second portion CA2 of the compressed air CA in the first pressure chamber 114. In addition or in the alternative, the flow control valve 152 may be configured to control the second pressure P2 of the third portion CA3 of the compressed air CA in the second pressure chamber 144. The flow control valve 152 may be configured to modulate the first pressure P1 and the second pressure P2 in order to provide a desired axial pressure or axial load AL, axially forward or axially aft, on the pressure seal disk 108 and the high-pressure rotor shaft 46 dependent on an operating condition of the turbomachine 26 to reduce or prevent axial thrust loads on the axial thrust bearings.

Vibrations may result on the high-pressure rotor shaft 46 during certain operating conditions. Most intense vibrations are generally observed when rotor thrust is minimal, zero, or during thrust crossover conditions. This disclosure provides a way to effectively change or buffer the rotor thrust in order to mitigate these high vibrations in the high-pressure rotor shaft 46. The components described in the disclosure avoid high N2 vibration issues without having to mount additional hardware mounted to the turbomachine, thus imparting additional axial forward or aft thrust and hence protecting a possible thrust reversal/N2 vibration at the bearing location(s).

Further aspects are provided by the subject matter of the following clauses:

A turbomachine, comprising a high-pressure rotor shaft extending along a longitudinal centerline of the turbomachine, the high-pressure rotor shaft having an outer surface and a rotor seal disposed along the outer surface; a compressor discharge plenum extending annularly around the outer surface of the high-pressure rotor shaft, wherein the compressor discharge plenum is at least partially formed from an inner casing assembly, wherein the inner casing assembly defines a first airflow opening, wherein the rotor seal is configured to form a first seal against a first surface of the inner casing assembly; and a pressure seal disk coupled to the high-pressure rotor shaft, wherein the pressure seal disk is configured to form a second seal against a second surface of the inner casing assembly, wherein the inner casing assembly, the high-pressure rotor shaft, the rotor seal, and the pressure seal disk form a pressure chamber therebetween, wherein the pressure chamber is in fluid communication with the compressor discharge plenum via the first airflow opening, and wherein compressed air from the compressor discharge plenum charges the pressure chamber during operation of the turbomachine and places an axial load against a face of the pressure seal disk.

A turbomachine, comprising a high-pressure rotor shaft defining an outer surface and including a rotor seal disposed along the outer surface; a compressor discharge plenum extending annularly around the outer surface of the high-pressure rotor shaft; an inner casing assembly defining a first airflow opening, wherein the rotor seal is configured to form a first seal against a first surface of the inner casing assembly, wherein the compressor discharge plenum is at least partially formed by the inner casing; and a pressure seal disk coupled to the high-pressure rotor shaft, wherein the pressure seal disk is configured to form a second seal against a second surface of the inner casing assembly, wherein the inner casing assembly, the high-pressure rotor shaft, the rotor seal, and the pressure seal disk form a pressure chamber therebetween, wherein the pressure chamber is in fluid communication with the compressor discharge plenum via the first airflow opening.

The turbomachine of the preceding or any following clause, further comprising a first insert disposed within the first airflow opening, wherein the insert is configured to control a flow of the compressed air from the compressor discharge plenum into and out of the pressure chamber.

The turbomachine of any preceding or following clause, wherein the inner casing assembly defines a second airflow opening disposed aft of the pressure seal disk within the compressor discharge plenum, wherein the second airflow opening is in fluid communication with the compressor discharge plenum.

The turbomachine of any preceding or following clause, further comprising a pump, wherein the pump is fluidly coupled to the compressor discharge plenum and to the first airflow opening, wherein the pump is configured to control pressure of the compressed air from the compressor discharge plenum inside the pressure chamber.

The turbomachine of any preceding or following clause, further comprising a turbine rotor disk coupled to the high-pressure rotor shaft, wherein the pressure seal disk is disposed forward of the turbine rotor disk with respect to the axial centerline.

The turbomachine of any preceding or following clause, further comprising a compressor flow conditioner disposed at an inlet of the compressor discharge plenum, and a turbine rotor disk disposed downstream from the compressor discharge plenum, wherein the pressure seal disk is disposed between the compressor flow conditioner and the turbine rotor disk.

The turbomachine of any preceding or following clause, further comprising a combustor disposed within the compressor discharge plenum.

The turbomachine of any preceding or following clause, wherein the rotor shaft defines a first bypass opening, wherein the first bypass opening is defined forward of the rotor seal.

The turbomachine of any preceding or following clause, wherein the rotor shaft defines a second bypass opening, wherein the second bypass opening is defined aft of the pressure seal disk and forward of a turbine rotor disk of the turbomachine.

The turbomachine of any preceding or following clause, further comprising at least one of a first bypass insert disposed within the first bypass opening and a second bypass insert disposed within the second bypass opening.

A turbomachine, comprising a high-pressure rotor shaft defining an outer surface; an inner casing assembly; a compressor discharge plenum at least partially formed by the inner casing assembly, wherein the inner casing assembly defines a first airflow opening and a second airflow opening; a pressure seal disk coupled to the high-pressure rotor shaft, the pressure seal disk having a forward side face, a sealing face, and an aft side face; a first pressure chamber at least partially defined by the high-pressure rotor shaft, the inner casing assembly, and the forward side face of the pressure seal disk, wherein the first pressure chamber is in fluid communication with the compressor discharge plenum via the first airflow opening; and a second pressure chamber at least partially defined by the high-pressure rotor shaft, the inner casing assembly, and the aft side face of the pressure seal disk, wherein the second pressure chamber is in fluid communication with the compressor discharge plenum via the second airflow opening.

The turbomachine of any preceding or following clause, further comprising a first rotor seal and a second rotor seal, wherein the first rotor seal is configured to form a first seal against a first surface of the inner casing assembly, the sealing face of the pressure seal disk is configured to form a second seal against a second surface of the inner casing assembly, and wherein the second rotor seal is configured to form a third seal against a third surface of the inner casing assembly.

The turbomachine of any preceding or following clause, further comprising a flow control valve having an inlet in fluid communication with the compressor discharge plenum, a first outlet in fluid communication with the first pressure chamber via the first airflow opening, and a second outlet in fluid communication with the second pressure chamber via the second airflow opening.

The turbomachine of any preceding or following clause, wherein the flow control valve is configured to control or modulate a first pressure in the first pressure chamber and a second pressure in the second pressure chamber.

An aircraft, comprising: a fuselage; and a turbomachine. The turbomachine comprising: a rotor shaft defining an axial centerline, the rotor shaft having an outer surface and a rotor seal disposed along the outer surface; a compressor discharge plenum extending annularly around the outer surface of the rotor shaft, wherein the compressor discharge plenum is at least partially formed from an inner casing assembly, wherein the inner casing assembly defines a first airflow opening, wherein the rotor seal is configured to form a first seal against a first surface of the inner casing assembly; and a pressure seal disk coupled to the rotor shaft, wherein the pressure seal disk is configured to form a second seal against a second surface of the inner casing assembly, wherein the inner casing assembly, the rotor shaft, the rotor seal, and the pressure seal disk form a pressure chamber therebetween, wherein the pressure chamber is in fluid communication with the compressor discharge plenum via the first airflow opening.

An aircraft, comprising a fuselage; and a turbomachine, the turbomachine comprising a high-pressure rotor shaft, the high-pressure rotor shaft having an outer surface and a rotor seal disposed along the outer surface; an inner casing assembly; a compressor discharge plenum extending annularly around the outer surface of the high-pressure rotor shaft, wherein the inner casing assembly defines a first airflow opening, wherein the rotor seal is configured to form a first seal against a first surface of the inner casing assembly; and a pressure seal disk coupled to the high-pressure rotor shaft, wherein the pressure seal disk is configured to form a second seal against a second surface of the inner casing assembly, wherein the inner casing assembly, the high-pressure rotor shaft, the rotor seal, and the pressure seal disk form a pressure chamber therebetween, wherein the pressure chamber is in fluid communication with the compressor discharge plenum via the first airflow opening.

The aircraft of the preceding or any following clause, wherein the turbomachine further comprises a first insert disposed within the first airflow opening, wherein the insert is configured to control a flow of the compressed air from the compressor discharge plenum into and out of the pressure chamber.

The aircraft of any preceding or following clause, wherein the inner casing assembly defines a second airflow opening disposed aft of the pressure seal disk within the compressor discharge plenum, wherein the second airflow opening is in fluid communication with the compressor discharge plenum.

The aircraft of any preceding or following clause, wherein the turbomachine further comprises a pump, wherein the pump is fluidly coupled to the compressor discharge plenum and to the first airflow opening, wherein the pump is configured to control pressure of the compressed air from the compressor discharge plenum inside the pressure chamber.

The aircraft of any preceding or following clause, wherein the turbomachine further comprises a turbine rotor disk coupled to the rotor shaft, wherein the pressure seal disk is disposed forward of the turbine rotor disk with respect to the axial centerline.

The aircraft of any preceding or following clause, wherein the turbomachine further comprises a compressor flow conditioner disposed at an inlet of the compressor discharge plenum, and a turbine rotor disk disposed downstream from the compressor discharge plenum, wherein the pressure seal disk is disposed between the compressor flow conditioner and the turbine rotor disk.

The aircraft of any preceding or following clause, wherein the turbomachine further comprises a combustor disposed within the compressor discharge plenum.

The aircraft of any preceding or following clause, wherein the rotor shaft defines a first bypass opening, wherein the first bypass opening is defined forward of the rotor seal.

The aircraft of any preceding or following clause, wherein the rotor shaft defines a second bypass opening, wherein the second bypass opening is defined aft of the pressure seal disk and forward of a turbine rotor disk of the turbomachine.

The aircraft of any preceding or following clause, wherein the turbomachine further comprises at least one of a first bypass insert disposed within the first bypass opening and a second bypass insert disposed within the second bypass opening.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A turbomachine, comprising:

a high-pressure rotor shaft defining an outer surface and including a rotor seal disposed along the outer surface;

a compressor discharge plenum extending annularly around the outer surface of the high-pressure rotor shaft;

an inner casing assembly defining a first airflow opening, wherein the rotor seal is configured to form a first seal against a first surface of the inner casing assembly, wherein the compressor discharge plenum is at least partially formed by the inner casing;

a pressure seal disk coupled to the high-pressure rotor shaft, wherein the pressure seal disk is configured to form a second seal against a second surface of the inner casing assembly, wherein the inner casing assembly, the high-pressure rotor shaft, the rotor seal, and the pressure seal disk form a pressure chamber therebetween, wherein the pressure chamber is in fluid communication with the compressor discharge plenum via the first airflow opening, and wherein the pressure chamber consists of a single airflow opening defined by the first airflow opening; and a first insert disposed within the first airflow opening, wherein the first insert is configured to control a flow of compressed air from the compressor discharge plenum into and out of the pressure chamber.

2. The turbomachine of claim 1, wherein the inner casing assembly defines a second airflow opening disposed aft of the pressure seal disk within the compressor discharge plenum, wherein the second airflow opening is in fluid communication with the compressor discharge plenum.

3. The turbomachine of claim 1, further comprising a pump, wherein the pump is fluidly coupled to the compressor discharge plenum and to the first airflow opening, wherein the pump is configured to control pressure of the compressed air from the compressor discharge plenum inside the pressure chamber.

4. The turbomachine of claim 1, further comprising a turbine rotor disk coupled to the high-pressure rotor shaft, wherein the pressure seal disk is disposed forward of the turbine rotor disk.

5. The turbomachine of claim 1, further comprising a compressor flow conditioner disposed at an inlet of the compressor discharge plenum, and a turbine rotor disk disposed downstream from the compressor discharge plenum, wherein the pressure seal disk is disposed between the compressor flow conditioner and the turbine rotor disk.

6. The turbomachine of claim 1, further comprising a combustor disposed within the compressor discharge plenum.

7. The turbomachine of claim 1, wherein the high-pressure rotor shaft defines a first bypass opening, wherein the first bypass opening is defined forward of the rotor seal.

8. The turbomachine of claim 7, wherein the high-pressure rotor shaft defines a second bypass opening, wherein the second bypass opening is defined aft of the pressure seal disk and forward of a turbine rotor disk of the turbomachine.

9. The turbomachine of claim 8, further comprising at least one of a first bypass insert disposed within the first bypass opening and a second bypass insert disposed within the second bypass opening.

10. A turbomachine, comprising:

a high-pressure rotor shaft defining an outer surface;

an inner casing assembly;

a compressor discharge plenum at least partially formed by the inner casing assembly, wherein the inner casing assembly defines a first airflow opening and a second airflow opening;

a pressure seal disk coupled to the high-pressure rotor shaft, the pressure seal disk having a forward side face, a sealing face, and an aft side face;

a first pressure chamber at least partially defined by the high-pressure rotor shaft, the inner casing assembly, and the forward side face of the pressure seal disk, wherein the first pressure chamber is in fluid communication with the compressor discharge plenum via the first airflow opening, and wherein the first pressure chamber consists of a single airflow opening defined by the first airflow opening;

a first insert disposed within the first airflow opening, wherein the first insert is configured to control a flow of compressed air from the compressor discharge plenum into and out of the pressure chamber; and a second pressure chamber at least partially defined by the high-pressure rotor shaft, the inner casing assembly, and the aft side face of the pressure seal disk, wherein the second pressure chamber is in fluid communication with the compressor discharge plenum via the second airflow opening, and wherein the second pressure chamber consists of a single airflow opening defined by the second airflow opening.

11. The turbomachine of claim 10, further comprising a first rotor seal and a second rotor seal, wherein the first rotor seal is configured to form a first seal against a first surface of the inner casing assembly, the sealing face of the pressure seal disk is configured to form a second seal against a second surface of the inner casing assembly, and wherein the second rotor seal is configured to form a third seal against a third surface of the inner casing assembly.

12. The turbomachine of claim 10, further comprising a flow control valve having an inlet in fluid communication with the compressor discharge plenum, a first outlet in fluid communication with the first pressure chamber via the first airflow opening, and a second outlet in fluid communication with the second pressure chamber via the second airflow opening.

13. The turbomachine of claim 12, wherein the flow control valve is configured to modulate a first pressure in the first pressure chamber and a second pressure in the second pressure chamber.

14. An aircraft, comprising:

a fuselage; and a turbomachine, the turbomachine comprising:

a high-pressure rotor shaft, the high-pressure rotor shaft having an outer surface and a rotor seal disposed along the outer surface;

an inner casing assembly;

a compressor discharge plenum extending annularly around the outer surface of the high-pressure rotor shaft, wherein the inner casing assembly defines a first airflow opening, wherein the rotor seal is configured to form a first seal against a first surface of the inner casing assembly;

a pressure seal disk coupled to the high-pressure rotor shaft, wherein the pressure seal disk is configured to form a second seal against a second surface of the inner casing assembly, wherein the inner casing assembly, the high-pressure rotor shaft, the rotor seal, and the pressure seal disk form a pressure chamber therebetween, wherein the pressure chamber is in fluid communication with the compressor discharge plenum via the first airflow opening, and wherein the pressure chamber consists of a single airflow opening defined by the first airflow opening; and a first insert disposed within the first airflow opening, wherein the first insert is configured to control a flow of compressed air from the compressor discharge plenum into and out of the pressure chamber.

15. The aircraft of claim 14, wherein the inner casing assembly defines a second airflow opening disposed aft of the pressure seal disk within the compressor discharge plenum, wherein the second airflow opening is in fluid communication with the compressor discharge plenum.

16. The aircraft of claim 14, wherein the turbomachine further comprises a pump, wherein the pump is fluidly coupled to the compressor discharge plenum and to the first airflow opening, wherein the pump is configured to control pressure of the compressed air from the compressor discharge plenum inside the pressure chamber.

17. The aircraft of claim 14, wherein the high-pressure rotor shaft defines a first bypass opening defined forward of the rotor seal, wherein the high-pressure rotor shaft defines a second bypass opening defined aft of the pressure seal disk and forward of a turbine rotor disk of the turbomachine.

18. The aircraft of claim 17, wherein the turbomachine further comprises at least one of a first bypass insert disposed within the first bypass opening and a second bypass insert disposed within the second bypass opening.

* * * * *